United States Patent
Yu

(10) Patent No.: US 6,968,321 B1
(45) Date of Patent: Nov. 22, 2005

(54) METHOD AND SYSTEM FOR REMOTE OPERATOR INTERFACE WITH A SELF-SERVICE FINANCIAL TRANSACTIONS TERMINAL

(75) Inventor: Chris S. Yu, Hacienda Heights, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 1017 days.

(21) Appl. No.: 09/702,428

(22) Filed: Oct. 31, 2000

Related U.S. Application Data

(60) Provisional application No. 60/163,000, filed on Nov. 1, 1999, provisional application No. 60/162,816, filed on Jan. 11, 1999.

(51) Int. Cl.[7] ............................................. G06F 17/60
(52) U.S. Cl. ............................. 705/43; 705/42; 705/1; 379/9.01; 379/9.02; 379/27.04; 379/29.01
(58) Field of Search ............................... 705/43, 42, 1; 379/9.01, 9.02, 27.04, 29.01

(56) References Cited

U.S. PATENT DOCUMENTS

| | | | |
|---|---|---|---|
| 3,956,615 A | | 5/1976 | Anderson et al. |
| 5,253,167 A | | 10/1993 | Yoshida et al. |
| 5,484,993 A | | 1/1996 | Seto et al. |
| 5,533,093 A | * | 7/1996 | Horton et al. ................ 379/21 |
| 5,563,393 A | | 10/1996 | Coutts |
| 5,818,446 A | * | 10/1998 | Bertram et al. ............. 345/746 |
| 5,969,316 A | | 10/1999 | Greer et al. |
| 6,311,165 B1 | * | 10/2001 | Coutts et al. ................ 705/21 |
| 6,598,023 B1 | * | 7/2003 | Drummond et al. ........... 705/1 |

FOREIGN PATENT DOCUMENTS

WO   WO 9828720   * 7/1998   ............. G07F 7/10

OTHER PUBLICATIONS

IBM's Pet Project; Internet Week, Dec. 8, 1997, p. 7; The Gale Group, publisher.
Eileen Courter: ATM Trends- Networking and Security; Credit Union Management, vol. 23, No. 5, pp. 42-44; May 2000; Bell & Howell, publisher.
Kenneth Kiesnoski: Banks Hatch Plans for Internet-Enabled Machines; Bank Systems & Technology, vol. 37, No. 4, p. 20; Apr. 2000; Bell & Howell, publisher.

* cited by examiner

*Primary Examiner*—Jagdish Patel
(74) *Attorney, Agent, or Firm*—George T. Marcou; Kilpatrick Stockton LLP

(57) ABSTRACT

A method and system for remote operator interface with a self-service transaction terminal, such as an ATM makes use of a set of web based applications for operator functions to enable the remote operator to access the operator functions over a standard browser from a remote operator interface client PC. Each ATM with which the remote operator interface is used has a set of web based applications that supports the operator functions. The operator accesses the ATM from the client PC by bringing up the browser and entering a URL to point to a specific ATM. The remote operator interface supports a plurality of supervisory type functions and enables the user to administer a plurality of ATMs for which it is configured to allow the particular functions to be performed. Communication via the remote operator interface is secure over a private network or virtual private network (VPN) over the Internet. The remote operator must be authenticated to gain access, and the operator's entitlements may limit access.

31 Claims, 6 Drawing Sheets

| | |
|---|---|
| Reboot | — 20 |
| Stop ATM | — 22 |
| Stop ATM immediately | — 24 |
| Starting ATM | — 26 |
| Configure ATM | — 28 |
| View ATM Configuration | — 30 |
| View software release information | — 32 |
| View ATM status | — 34 |
| View INC and Host Connection Status | — 36 |
| Start peruse | — 38 |
| View event logs | — 40 |
| View event logs in real time | — 42 |
| Write event logs to file | — 44 |
| Start back administration | — 46 |
| Start command shell | — 48 |
| Initialize PIN encryption keys | — 50 |

FIG. 3

| Operator Functions | Remote OI | Local OI | INC |
|---|---|---|---|
| Reboot | yes | yes | yes |
| Shutdown | no | no | no |
| Start/stop/stop immediate | yes | yes | yes |
| Configure ATM | no | yes | no |
| View ATM configuration | no | yes | no |
| View software release information | yes | yes | yes |
| View ATM status | yes | yes | yes |
| View INC and host connection status | yes | yes | yes |
| Start peruse | yes | yes | yes |
| View event logs | yes | yes | yes |
| View event logs in real-time | yes | yes | no |
| Write event logs to file | yes | no | no |
| Start administrative functions | yes | yes | no |
| Start diagnostics (utility provided by vendor) | no | no | no |
| View information – administrative functions | yes | yes | no |
| Initialize PIN encryption keys | no | yes | no |

FIG. 4

| Country | Default Language | Additional Languages for Selection |
|---|---|---|
| Belgium | Dutch | French, English |
| France | French | English |
| Germany | German | English |
| Greece | English | |
| Hungary | English | |
| Italy | Italian | English |
| Spain | Spanish | Catalan, English |
| UK | English | |
| U.S. | English | |

FIG. 6

METHOD AND SYSTEM FOR REMOTE OPERATOR INTERFACE WITH A SELF-SERVICE FINANCIAL TRANSACTIONS TERMINAL

PRIORITY APPLICATIONS

This application claims priority to now abandoned U.S. Provisional Application No. 60/163,000 filed Nov. 1, 1999, entitled "Method and System of Remote Operator Interface for a Self-Service Financial Terminal (Remote Operator Interface)," and is incorporated herein by reference.

This application claims priority to now abandoned U.S. Provisional Application Ser. No. 60/162,816 filed Nov. 1, 1999, entitled "Method And System For Coordinating Session Activities At A Self-Service Financial Transaction Terminal (ATM Session Manager)," and is incorporated herein by reference.

CROSS REFERENCE TO RELATED APPLICATIONS

This application relates to Ser. No. 09/702,390, filed simultaneously, entitled "Method And System For Secure Communication Between A Self-Service Financial Transaction Terminal And A Remote Operator Interface," and is incorporated herein by reference.

This application relates to Ser. No. 09/703,160, filed simultaneously, entitled "Method And System For Obtaining Device Services On A Self-Service Financial Transaction Terminal," and is incorporated herein by reference.

This application relates to Ser. No. 09/702,433, filed simultaneously, entitled "Method And System For Installing And/Or Upgrading Software On A Self-Service Financial Transaction Terminal From A Remote Computer," and is incorporated herein by reference.

This application relates to Ser. No. 09/703,168, filed simultaneously, entitled "Method And System For Simultaneous And Unattended Installation Of Software On A Self-Service Financial Transaction Terminal," and is incorporated herein by reference.

This application relates to Ser. No. 09/702,333, filed simultaneously, entitled "Method And System For Coordinating Session Activities At A Self-Service Financial Transaction Terminal," and is incorporated herein by reference.

This application relates to Ser. No. 09/702,333, filed simultaneously, entitled "Method And System For Configuration Of Self-Service Financial Transaction Terminals For A Common Software Release," and is incorporated herein by reference.

This application relates to U.S. Provisional Application No. 60/162,673, filed Nov. 1, 1999, entitled "Method And System For Secure Communication Between A Self-Service Transaction Terminal And A Remote Operator Interface (Remote Operator Interface Security)," and is incorporated herein by reference.

This application relates to U.S. Provisional Application No. 60/162,994, filed Nov. 1, 1999, entitled "Method And System For Extensions For Financial Services Service Provider Framework For A Self-Service Transaction Terminal (XFS Service Provider Framework)," and is incorporated herein by reference.

This application relates to U.S. Provisional Application No. 60/163,002, filed Nov. 1, 1999, entitled "Method And System For Installing And/Or Upgrading Software On A Self-Service Financial Transaction Terminal From A Remote Computer (Remote Installation/Software Upgrade)," and is incorporated herein by reference.

This application relates to U.S. Provisional Application No. 60/162,815, filed Nov. 1, 1999, entitled "Method And System For Simultaneous And Unattended Installation Of Software On A Self-Service Financial Transaction Terminal (Global Installation Framework)," and is incorporated herein by reference.

This application relates to U.S. Provisional Application No. 60/162,672, filed Nov. 1, 1999, entitled "Method And System For Configuration Of Self-Service Financial Terminals For A Common Software Release (Framework For Configuration Of Self-Service Financial Terminals)," and is incorporated herein by reference.

COPYRIGHT NOTIFICATION

A portion of the disclosure of this patent document and its figures contain material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Field of the Invention

This invention relates generally to the field of self-service financial transaction terminals, such as automatic teller machines (ATMs), and more particularly to a method and system for remote operator interface with a self-service financial terminal, such as an ATM.

2. Background of the Invention

ATMs include computer applications or software running on computer hardware within the ATM which, for example, interfaces with a host computer and other remote computers connected to the ATM over a network. On ATM systems that a financial institution, such as a bank, develops and that are used in branches or other locations, there are a set of functions that are used by supervisors and operators in the branch. These operator and supervisor functions are outside of the customer applications and need to be performed on a routine basis to maintain the service to administer those ATMs.

Currently, a way that the financial institution addresses that problem is to have a text based terminal that is connected over a serial line to the ATM platform developed by the financial institution. However, for a global ATM system, as the financial institution moves into a more off-the-shelf type of environment, for example, where hardware is purchased from different ATM vendors, that solution does not work for all vendor platforms. Further, the text based terminals are not a viable solution, because the technology is out of date and the cost of those terminals is also relatively high. Therefore, there is a need for an alternative to support the use of the operator functions for maintaining and servicing the ATMs, which is also a platform independent solution.

SUMMARY OF THE INVENTION

It is a feature and advantage of the present invention to provide a method and system for remote operator access with a self-service financial terminal, such as an ATM, that enables a user to access the ATM over a standard browser from a personal computer (PC).

It is another feature and advantage of the present invention to provide a method and system for remote operator access with a self-service financial terminal that eliminates the need for a customized, highly technology dependent, specific type of device, such as a text based terminal.

It is an additional feature and advantage of the present invention to provide a method and system for remote operator access with a self-service financial terminal utilizing a client-server architecture.

It is a further feature and advantage of the present invention to provide a method and system for remote operator interface with a self-service financial terminal which supports a plurality of supervisor type functions.

It is still another feature and advantage of the present invention to provide a method and system for remote operator interface for a self-service financial terminal that leverages Internet technology and makes the remote operator interface application very flexible and very easy to use.

It is still an additional feature and advantage of the present invention to provide a method and system for remote operator interface for a self-service financial terminal that allows the user to administer a plurality of ATMs.

To achieve the stated and other features, advantages and objects, the method and system for an embodiment of the present invention makes use of a set of web based applications for the operator functions to enable the operator to access the operator functions over a standard browser from a PC. An embodiment of the present invention makes use of a system component referred to as a remote operator interface PC. Each ATM with which the remote operator interface is used has a set of web based applications installed on it that supports the operator functions.

In an embodiment of the present invention, an operator accesses the ATM from the client PC by bringing up the browser and typing in, for example, a uniform resource locator (URL) to point to the specific ATM. The remote operator interface supports a plurality of functions including, for example, supervisory functions, and enables the user to administer a plurality of ATMs, for which it is configured, to allow the particular functions to be performed. Communication via the remote operator interface is secure over a private network or virtual private network (VPN) over the Internet. An operator must be authenticated to gain access, and the operator's entitlements may limit access.

In an embodiment of the present invention, the remote operator is allowed to access a self-service financial terminal, such as the ATM, via the browser application of a computing device, such as a personal computer, personal digital assistant (PDA), web-enabled wired or wireless telephone device, as well as a consumer device, such as a Web-TV, or a text-based terminal, such as a VT-100, coupled to the ATM over a network. The ATM is provided with one or more web server applications having a URL address. The remote operator accesses the ATM by entering the URL address for a web server application of the ATM, and the ATM and personal computer mutually authenticate one another. After mutual authentication, the remote operator interface is started, and a logon screen is displayed for the operator at the personal computer.

In response to a prompt, the remote operator enters a user identification on the logon screen, such as a user ID and/or a password, which corresponds to a particular user entitlement. In addition, when the remote operator session is started, the operator is prompted for selection of a preferred language for the session. The user identification is verified, and if the entered user identification is valid, a main menu of ATM operator functions is displayed for the remote operator, which corresponds to the particular user entitlement associated with the user identification.

Depending on the user entitlement for the remote operator, the ATM operator functions displayed on the main menu includes one or more functions selected from a group of operator functions consisting of a reboot function, a stop function, stop immediately function, a start function, a configure function, a view configuration function, a view software release information function, a view status function, a view integrated network controller and host connection status function, a start peruse function, a view event logs function, a view event logs in real-time function, a write event logs to file function, a start back administration function, a start command shell function, and an initialize personal identification number encryption keys function.

From the main menu displayed for the remote operator, the operator enters a selection of at least one of the ATM operator functions according to the predetermined user entitlement corresponding to the user identification. The remote operator is then allowed to access an application for the selected ATM terminal operator function. The selected application that is brought up likewise corresponds to the predetermined user entitlement associated with the user identification entered by the remote operator.

Likewise, the application that the remote operator is allowed to access includes one or more functions selected from a group of operator functions consisting of a reboot function, a stop function, stop immediately function, a start function, a configure function, a view configuration function, a view software release information function, a view status function, a view integrated network controller and host connection status function, a start peruse function, a view event logs function, a view event logs in real-time function, a write event logs to file function, a start back administration function, a start command shell function, and an initialize personal identification number encryption keys function.

The remote operator is allowed to perform one or more tasks associated with the accessed function, and the remote operator can end the session by selecting an exit button displayed on the main menu. A feature of the remote operator interface for an embodiment of the present invention restricts operator interface with the ATM to a single operator interface at any one time. Thus, the remote operator interface cannot be used while another operator interface session of any type is in process, and another operator interface session of any type cannot be performed while the remote operator interface is in process.

Additional objects, advantages, and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 3 is a table which shows examples of the operator functions supported through remote operator interface for an embodiment of the present invention;

FIG. 4 is a table which shows examples of operator functions that are accessible through the remote operator interface for an embodiment of the present invention and also indicates examples of functions available locally at the ATM via a local operator interface or at the integrated network controller (INC);

FIG. 6 is a table which illustrates examples of the default language and additional languages available for language selection for an embodiment of the present invention.

DETAILED DESCRIPTION

Figure 1:
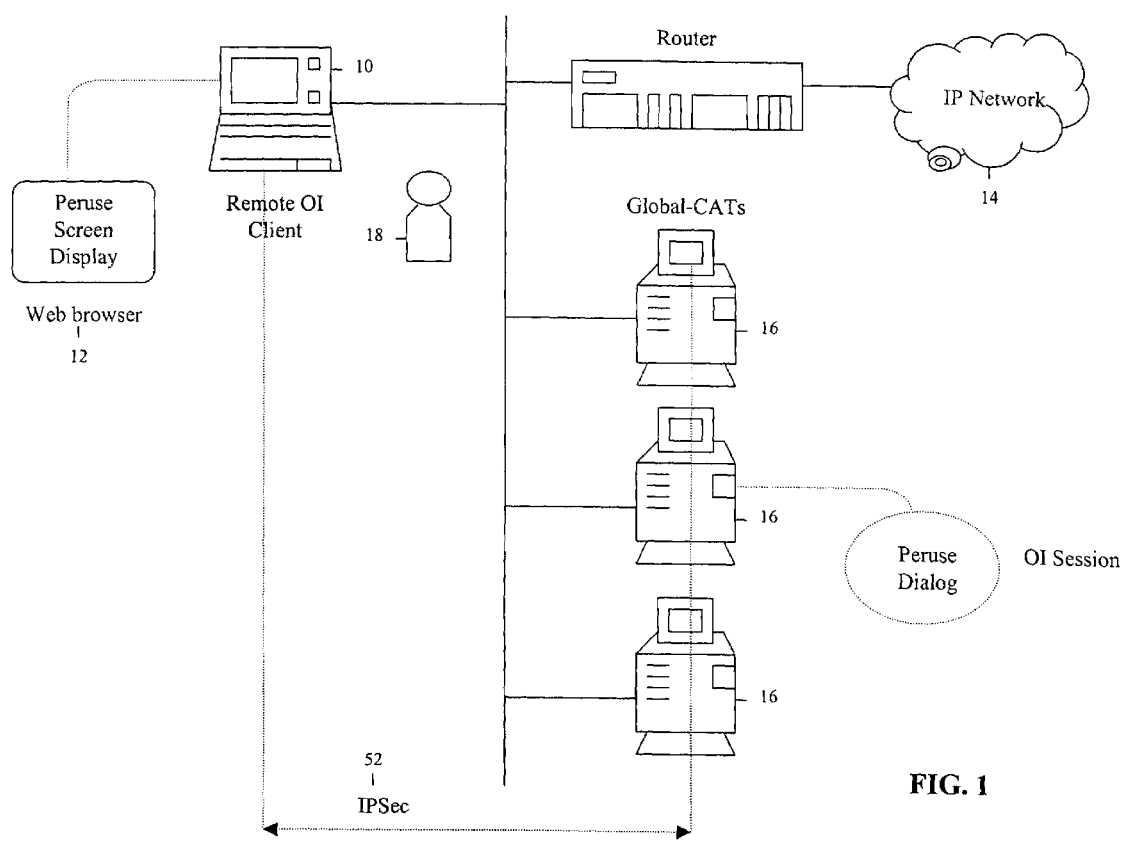
FIG. 1 illustrates an example overview of key components and the flow of information between the key components of the remote operator interface for an embodiment of the present invention.

Referring now in detail to an embodiment of the present invention, an example of which is illustrated in the accompanying drawings, FIG. 1 illustrates an example overview of key components and the flow of information between the key components of the remote operator interface for an embodiment of the present invention. Referring to FIG. 1, the remote operator interface for an embodiment of the present invention makes use, for example, of a personal computer (PC) 10 having a web browser 12 and coupled over a network 14 to one or more automatic teller machines (ATMs) 16.

On a typical NT ATM system, supervisors and branch staff rely on a suite of 'operator functions' to service and administer the machines. Operators access the operator functions on a text terminal, which is connected to an NT ATM system through a serial line. For a global ATM product, the need for the operator functions still exists. However, using the operator functions on a text terminal is no longer a viable solution. The remote operator interface for an embodiment of the present invention provides a solution for using operator functions on global ATM systems by resolving a number of issues.

Such issues include, for example, that the text terminal is an outdated product for which it is increasingly difficult to purchase new units and is expensive to maintain. In addition, serial port connection may not be available on all ATM platforms, and in order to have a vendor independent global ATM product, the solution cannot depend on availability of a serial port connection. Further, although operator functions can be used at the front screen of the ATM, that is often not the preferred arrangement. For example, it is inconvenient to use the back administration function at the front screen, and performing operator functions at the front screen can tie up an ATM which customers may be waiting to use.

The solution offered by the remote operator interface for an embodiment of the present invention makes the operator functions accessible from the remote operator interface client PC 10 over a TCI/IP network 14. Stated simply, the remote operator interface for an embodiment of the present invention makes use of PC and network technology to replace the legacy text terminal and serial line connection. Moreover, the operator functions for global ATMs are a set of Web based applications that are accessible from the remote operator interface client PC 10 through the use of the Web browser 12.

The method and system for an embodiment of the present invention makes use of a set of web based applications for the operator functions, such that an operator 18 is able to simply access those operator or supervisor functions over a standard browser 12 from the (PC) 10, which is referred to as a remote operator interface client PC. An embodiment of the present invention totally eliminates the need for any kind of customized, highly technology dependent, specific type of device, such as a text based terminal.

As PCs have become so widely used and Internet web based technology has become such a standard, the remote operator interface for an embodiment of the present invention that is based on web technology provides an ideal solution. An embodiment of the present invention utilizes the system component referred to as the remote operator interface client PC 10 for each ATM 16. Each ATM 16 with which the remote operator interface is used is provided with a set of web based applications installed on it that supports the operator functions. Thus, in terms of the configuration, an embodiment of the present invention makes use of a client-server based architecture.

In an embodiment of the present invention, the client is the PC 10 from which an operator accesses the ATM 16 by bringing up the browser 12 and typing in a uniform resource locator (URL) to point to a specific one of the ATMs 16. On the server side, the ATM 16 has a web server which runs, for this example, the Microsoft Internet Information Server (IS). The access from the PC 10 simply goes through this standard web application, and the operator 18 is able to bring up this application and then log into the particular one of the ATMs 16 on which the operator 18 wants to perform certain types of functions. The operator 18 then initiates those functions.

Aspects of an embodiment of the present invention address, for example, the system requirements for remote operator interface, the procedure to use remote operator interface, and the operator functions supported through remote operator interface. The system requirements include, for example, hardware, software, and network connectivity. An embodiment of the present invention utilizes at least one remote operator interface client PC 10 for the remote operator interface on global ATM systems. Examples of suitable minimum hardware requirements for PC 10 include an Intel Pentium class central processing unit (CPU), 64 MB RAM, support screen resolution of 800×600×256 colors, and an ethernet card.

In addition, in order to print transaction log information from peruse, the PC 10 should also have, for example, a Windows NT compatible printer connected to it. There are no additional hardware requirements for the global ATM systems on which the remote operator interface is used to service and administer the ATMs 16. The remote operator interface for an embodiment of the present invention functions the same way regardless of whether the ATMs 16 are from different vendors, are front-loading or rear-loading type, or are installed in through-the-wall configuration or in a branch lobby.

Software requirements for an embodiment of the present invention include vendor software, such as Microsoft Windows NT 4.0, Microsoft Internet Explorer 4.01 or above, and IRE SafeNet/Soft-PK (for secure end-to-end communication) installed on the remote operator interface client PC 10. Note that the requirement for the Internet Explorer applies to a particular release for the remote operator interface, and other releases of the remote operator interface can support any suitable browser, such as Microsoft and Netscape browsers. The operator functions accessed through the remote operator interface are integrated into the global ATM product. Therefore, all software required for the remote operator interface on the global ATM system, such as the IRE SafeNet/Soft-PK, are installed on the ATM 10 during global ATM installation.

Figure 2:
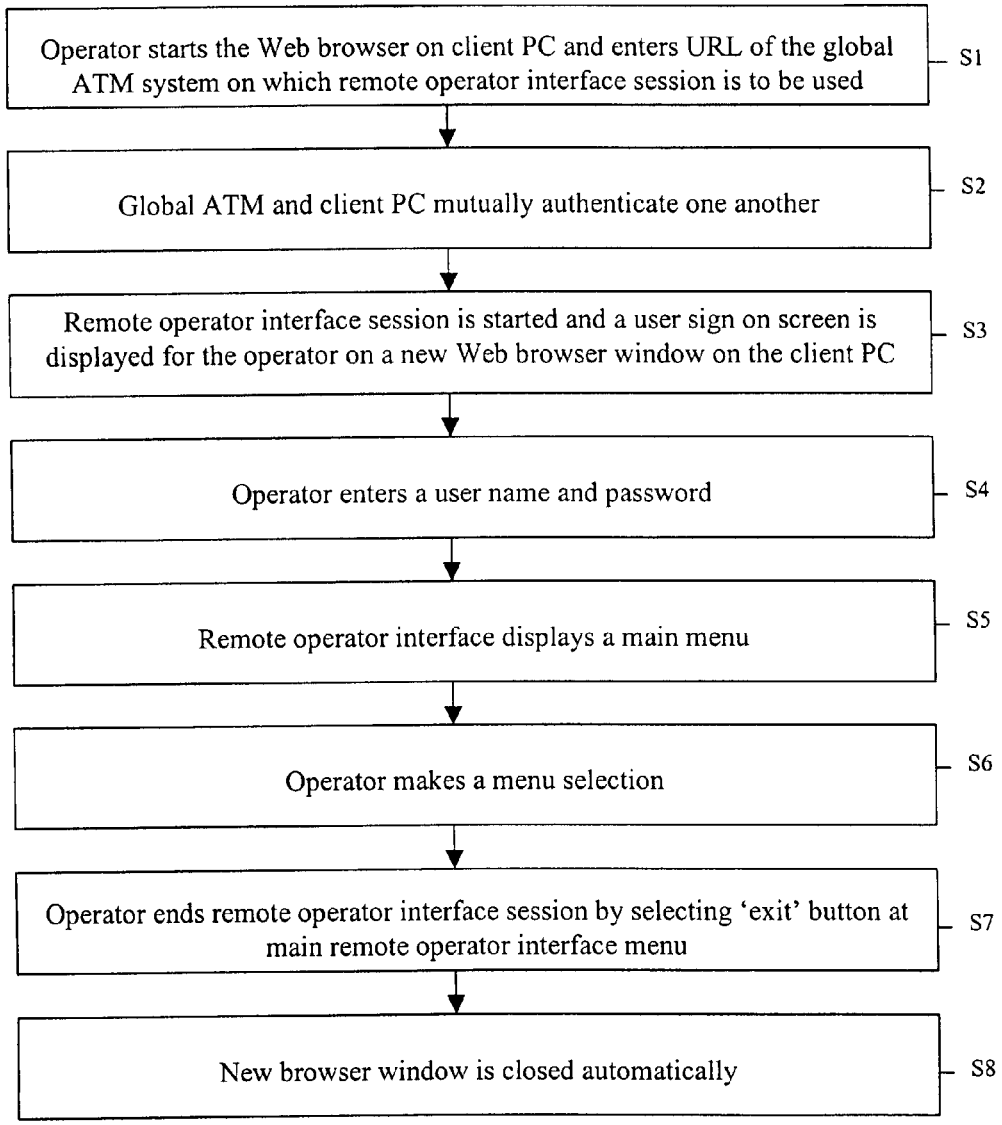
FIG. 2 is a flow chart which illustrates an example of the process of using the remote interface for an embodiment of the present invention, including starting and ending remote operator interface sessions.

FIG. 2 is a flow chart which illustrates an example of the process of using the remote interface for an embodiment of the present invention, including starting and ending remote operator interface sessions. The client PC 10 can be used to start a remote operator interface session on any global ATM machine 16 configured to be used with the PC 10. Referring to FIG. 2, at S1, the operator 18 starts the Web browser 12 on the client PC 10. The operator 18 enters the URL of the global ATM system 16 on which the remote operator interface session is to be used. The URL is entered, for example, as "http://NodeName/oi", where "NodeName" is the name of the global ATM system 16.

Referring further to FIG. 2, at S2, the global ATM 16 and the client PC 10 mutually authenticate one another. At S3, after mutual authentication, the remote operator interface session is started, and a user sign on screen is displayed for the operator 18 on a new Web browser window on the client PC 10. From this point onward, the procedure for using the remote operator interface and local operator interface, for example, at the front screen of the ATM 16, is identical. At S4, the operator 18 enters a user name and password. After the operator 18 enters a valid remote operator interface user name and password, at S5, the remote operator interface displays its main menu, from which the operator 18 can make a menu selection at S6.

Referring again to FIG. 2, at S7, the operator 18 can end the remote operator interface session by selecting the 'exit' button at the main remote operator interface menu. At S8, this also causes the new browser window to be closed automatically. Terminating a remote operator interface session by closing the browser window should be avoided, as it may not provide an opportunity for an operator function to complete normally.

An aspect of an embodiment of the present invention involves designing a restriction into the remote operator interface by which only one operator interface session is allowed at any time. Therefore, if a local operator interface session is already started, for example, at the front display of a global ATM machine, other operators are unable to start a remote operator interface session on the same global ATM machine. Similarly, if a remote operator interface is already in session, other operators cannot bring up either a local operator interface session or another remote operator interface session. Allowing only a single operator interface session, either local or remote, eliminates the possibility that multiple operator interface sessions can interfere with one another.

The remote operator interface for an embodiment of the present invention supports a number of operator functions, such as rebooting the ATM, performing a stop or immediate stop of the ATM, starting the ATM, configuring the ATM or viewing the ATM configuration, and allowing the operator to look at what software releases are installed on the ATM. The remote operator interface also supports such functions as viewing the overall status of the ATM in terms of all the peripheral devices, such as whether they are functioning or not, and the connections to the host system, such as whether the connection is available or not, and/or the connection to the system management node, and whether that connection is available up or down.

In addition, other operator functions supported by the remote operator interface for an embodiment of the present invention include, for example, looking specifically at the connectivity with the system management and with the host and providing the node address of the host. Additional operator functions supported by the remote operator interface also include, for example, looking at the transaction log which keeps a history of detailed transaction records for the activities that are performed by customers at the ATM, so that through the remote operator interface, a supervisor at the branch can use information in the transaction log to pinpoint whether a customer has performed a certain transaction in situations, for example, where there are disputes or where reconciliations are needed.

Additional operator functions supported by the remote operator interface for an embodiment of the present invention include, for example, looking at the system event logs on the machine in terms of finding out when certain system wide events or device related failures occurred. Those events are logged in, and the supervisor or a field engineer is able to find out more detailed information about those type of events. Additionally, other operator functions include, for example, starting up, running administration functions to reconcile the transaction history between the ATM and the back-end host, and performing settlement.

FIG. 3 is a table which shows examples of the operator functions supported through remote operator interface for an embodiment of the present invention. Referring to FIG. 3, operator functions supported through remote operator interface for an embodiment of the present invention include, for example, rebooting the ATM 20, stopping the ATM 22, stopping the ATM immediately 24, starting the ATM 26, configuring the ATM 28, viewing the ATM configuration 30, viewing software release information 32, viewing the ATM status 34, viewing the INC and host connection status 36, starting peruse 38, viewing event logs 40, viewing event logs in real time 42, writing event logs to file 44, starting back administration 46, starting the command shell 48, and initializing PIN encryption keys 50.

Referring further to FIG. 3, the reboot operator function 20 involves, for example, waiting for an active customer session to complete and then performing an orderly shutdown of infrastructure software and NT before rebooting NT and restarting infrastructure and application software. The stop ATM operator function 22 involves, for example, stopping the application and infrastructure software. This stop function 22 waits for a customer session to complete within a timeout period. Stop operation 22 causes the devices to be reinitialized at the XFS level (XFS defines a standard for application control of specialized ATM peripherals). In addition, the Web browser at the global ATM 16 is terminated and re-started. The stop operation 22 affects only the application and infrastructure software, and NT is not shutdown or rebooted.

Referring again to FIG. 3, the stop ATM immediately function 24 works the same as the stop ATM function 22 except that the stop takes effect immediately without waiting for a customer session to finish. The start ATM function 26 is invoked by the operator 18 to restart infrastructure and application software on the ATM 16 after using the stop function 22 or the stop immediate function 24. The configure ATM function 26 is used to configure or reconfigure various ATM node specific parameters, such as ATM TCP addresses, an integrated network controller (INC) node name, an INC node TCP address, business name, business address, and/or time zone. Configuration can be done either manually, or via data downloaded from the INC. The configure ATM function 26 also configures the global ATM system 16 to recognize certain PCs, such as PC 10, as remote operator clients.

Referring once more to FIG. 3, the view ATM configuration function 30 is used to display the ATM node specific parameters configured by the configure ATM operation 28 above. The view software release information function 32 is utilized to display the release level of application and infrastructure software and the build version of NT used in the particular ATM. However, neither file names of software modules nor any file attribute information is displayed by the view software information release information function 32.

Referring still again to FIG. 3, the view ATM status function 34 for an embodiment of the present invention reports the ATM status, such as whether the ATM 16 is up or down, whether the front end connection is up or down, whether the ATM devices are up or down, whether the ATM 16 is in customer session or idle, whether the ATM safe door is open or closed, whether the ATM 16 is in or out of a diagnostic session, and/or whether the ATM 16 is in or out of a back administration session. The view INC and host connection status function 36 reports the ATM status, such as, whether the ATM 16 is up or down, whether the ATM front end connection is up or down, whether the ATM devices are up or down, whether the ATM 16 is in a customer session or idle, whether the ATM safe door is open or closed, whether the ATM 16 is in or out of a diagnostic session, and/or whether the ATM 16 is in or out of a back administration session.

Referring still further to FIG. 3, the start peruse function 38 starts the peruse utility to view or search contents of the MIS transaction log. The view event logs function 40 enables the operator 18 to view the content of NT event logs with filtering capability. The view event logs in real-time function 42 allows the operator 18 to view updates to NT event logs in real time. The write event logs to file function 44 writes NT event logs to file on disks. The start back administration function 46 starts the back administration utility to perform proofing, settlement, and display counters information of the ATM 16. The start command shell function 48 starts a command shell which accepts and processes commands entered by the operator 18. The initialize PIN encryption keys function 50 initializes or re-initializes PIN encryption keys entered by the operator 18.

FIG. 4 is a table which shows examples of operator functions that are accessible through the remote operator interface for an embodiment of the present invention and also indicates examples of functions available locally at the ATM 16 via a local operator interface or at the INC. On ATMs configured with an operator panel, functions, such as shutdown and starting diagnostics are provided through the operator panel. However, for ATMs not so configured, these functions can also be provided by the remote operator interface. In addition, certain functions, such as starting peruse 38 and viewing event logs 40 require use of a keyboard for full functionality.

The overall solution provided by the remote operator interface for an embodiment of the present invention entails the concept of allowing an operator with privileges or entitlements, such as operator 18, to access an ATM 16 over the network 14. The term "remote" is used herein in the sense that the PC 10 which accesses the ATM 16 can be located, for example, in close proximity to the ATM itself, or it can be as remote as anywhere else in the world, as long as network connectivity allows the PC 10 to communicate with the ATM 16. That affords maximum flexibility and also leverages the Internet technology that makes the remote operator interface application both highly flexible and extremely easy to use.

In addition, the remote operator interface for an embodiment of the present invention allows the operator 18 the ability to administer all the ATMs 16 for which it is configured to allow those types of functions to be performed. For example, a branch may have two ATMs or may have ten ATMs on it, and one remote operator interface PC 10 is required to use the remote operator interface. In other words, it is only a matter of pointing to different ATMs in the URL to allow the operator 18 to bring up the operator functions on a particular ATM, such as one of ATMs 16. Thus, one of the benefits of using web based technology for an embodiment of the present invention is that it affords a great deal of flexibility, as well as cost saving benefits, in terms of eliminating the need for more than one type of terminal or device on which the operator interface is used.

Security for the remote operator interface for an embodiment of the present invention is handled primarily in a separate security configuration. The PC 10 on which the operator 18 runs the remote operator interface must have preconfigured information to allow the PC 10 to bring up the remote operator interface on a specific one of ATMs 16. Thus, it is not just any PC that is allowed even to connect to the particular ATM and access the remote operator interface function. The security configuration enables the remote operator interface to be flexible as well as secure, in terms of accessibility.

In an embodiment of the present invention, there is no limitation as to whether the network 14 is private or public Internet. In an aspect of an embodiment of the present invention, the network architecture on which the remote operator interface is deployed is a private network. However, it is a Transmission Control Protocol/Internet Protocol (TCP/IP) communications protocol-based network, and there is no inherent restriction built into the remote operator interface for an embodiment of the present invention which restricts its usage over a public network. Since a particular financial institution's ATM networks are all typically within its corporate private networks, an embodiment of the present invention may typically be used over the private network.

However, in another aspect of an embodiment of the present invention, if there is a need to tie into the public Internet, then the security configuration which is used enables that to be done securely over a public Internet, because essentially a virtual private network is created using the security configuration, which allows the establishment of a private tunneling between the ATM 16 and the remote operator interface PC 10.

An aspect of the remote operator interface for an embodiment of the present invention includes the use of user entitlements. For example, associated with a remote operator interface user group is a user logon ID that gives the operator 18 access to perform particular operations that the remote operator interface provides. The remote operator interface software is designed so that the operator 18 is allowed to perform only the functions that are within the operator's area of responsibility. The remote operator interface enforces this restriction, for example, by requiring the operator 18 to log onto the remote operator interface using a logon ID for the operator's user group which reflects the functions which the operator 18 can perform and supporting user entitlements, such as the authority to perform a certain operator function. Thus, when the operator 18 successfully logs onto the system by entering his or her operator interface logon ID and password, a menu is displayed containing only those operations that the particular operator can perform. In addition, user groups and their logon IDs are set up based on specific business requirements, by means of a customized configuration file.

In the remote operator interface for an embodiment of the present invention, user entitlement is a type of a security, as well as a functionality, which restricts a certain type of operator to be able to do only certain things. In other words, an operator, such as supervisor, can be allowed to look at the ATM transaction logs and shut down and reboot the ATM 18. The supervisor-operator 18 has certain specific functions that he or she is entitled to perform, and that is configured, based on the requirements of that business on which the remote operator interface is deployed.

Figure 5:
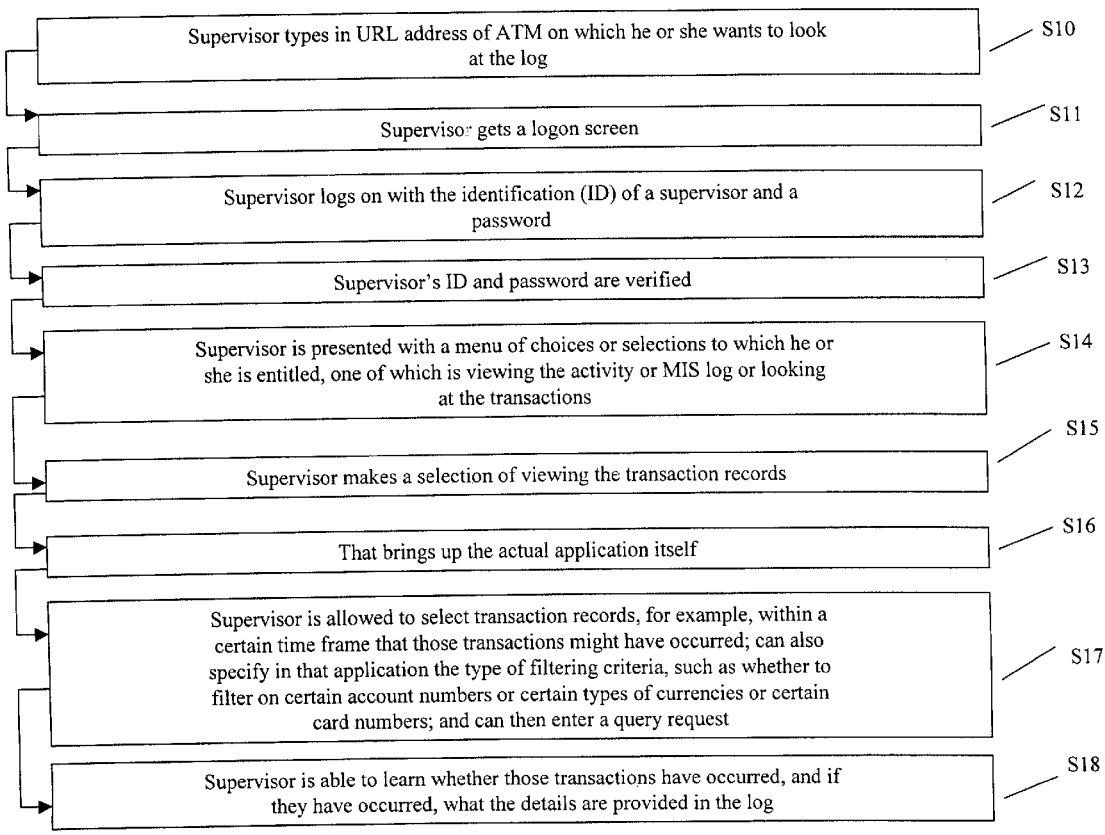
FIG. 5 is a flow chart which illustrates an example of the use of entitlements for an embodiment of the present invention.

FIG. 5 is a flow chart which illustrates an example of the use of entitlements for an embodiment of the present invention. Referring to FIG. 5, assume that the operator 18 is a supervisor who is entitled to look at the event log and wishes to do so. The process involves, for example, at S10, the supervisor-operator 18 first typing in the URL address of the ATM 16 on which he or she wants to look at the log. The supervisor-operator 18 enters the URL and gets a logon screen at S11. At S112, the supervisor-operator 18 then logs on with the ID of a supervisor and a password, which is verified at S13. At S14, the supervisor-operator 18 is presented with a menu of choices or selections to which he or she is entitled, one of which is viewing the event log.

Continuing with the example, at S15, the supervisor-operator 18 makes a selection of viewing the event records, which brings up the actual application itself at S16. At S17, the supervisor-operator 18 is allowed to select transaction records, for example, within a certain time frame during which those transactions might have occurred. The supervisor-operator 18 can also specify in that application, i.e., the event log application, the type of filtering criteria, such as whether to filter, for example, on certain account numbers or certain types of currencies or certain card numbers. The supervisor-operator 18 can then enter a query request and be able to find out whether those transactions have occurred, and if they have occurred, what the details are that are provided in the log.

In an embodiment of the present invention, all the applications are actually running on the server side or the ATM side. Thus, the remote operator interface for an embodiment of the present invention is a web server based application. There is actually nothing that is running on the client or the browser side, other than simply the information that is displayed. That information, i.e., the connection between the browser and the server, is all secured through the IPSECurity (IPSec) security protocol 52.

Since the operator functions are Web based applications, functioning of the remote operator interface for an embodiment of the present invention depends on the client PC 10 being able to 'reach' the global ATM system 16 over the TCP/IP network 14. In a typical branch configuration, the remote operator interface client PC 10 and the global ATM system 16 are likely on the same local area network 14. However, that is not a required network configuration. As long as the remote operator interface client requests can be delivered to the global ATM 16 over TCP/IP, the two systems can be far apart geographically. Therefore, there is no inherent restriction as to how far the remote operator interface client 10 can be separated from the global ATM 16. However, for operational convenience, the client PC 10 is probably best located in close proximity to the global ATM systems 16 that are being administered.

Another aspect for an embodiment of the present invention provides multi-lingual support. When a remote operator interface session is started, a default language is assigned to the session. The default language assigned is based on the country in which the ATM 16 is located. FIG. 6 is a table which illustrates examples of the default language and additional languages available for language selection for an embodiment of the present invention. The default language is used to prompt the operator for the language selection, and for the caption on the exit button. If a particular country supports only one language, a language selection screen is not displayed. For other countries, for example, English is used as the default language. If no other language is supported, a language selection screen is not displayed. Before an ATM 16 is configured, when the AcquirerCountryCode is not specified, the default language is English.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for remote operator interface with a self-service financial transaction terminal, comprising:

providing a plurality of web-based, customer-inaccessible applications for remote operator functions on the self-service financial transaction terminal, said remote operator functions being selected from a group of remote operator functions consisting of a reboot function, a stop function, a stop immediately function, a start function, a configure function, a view configuration function, a view software release information function, a view status function, a view integrated network controller and host connection status function, a start peruse function, a view event logs function, a view event logs in real-time function, a write event logs to file function, a start back administration function, a start command shell function, and an initialize personal identification number encryption keys function;

allowing a remote operator at a remote operator interface client computing device to access the self-service financial transaction terminal via a browser application of the remote operator interface client computing device;

receiving the remote operator's entry of a user identification by the self-service financial transaction terminal from the remote operator interface client computing device;

displaying a menu of the self-service financial transaction terminal operator functions for the remote operator at the remote operator interface client computing device by the self-service financial transaction terminal;

receiving the remote operator's selection of at least one of the self-service financial transaction terminal operator functions by the self-service financial transaction terminal from the remote operator interface client computing device; and allowing the remote operator at the remote operator interface client to access one of the plurality of web-based, customer-inaccessible applications on the self-service financial transaction terminal for the selected self-service financial transaction terminal operator function.

2. The method of claim 1, wherein allowing the remote operator to access the terminal further comprises allowing the remote operator to access the self-service financial transaction terminal via the browser application of the computing device coupled to the self-service financial transaction terminal.

3. The method of claim 2, wherein allowing the remote operator to access the terminal further comprises allowing the remote operator to access the self-service financial transaction terminal via the browser application of the computing device coupled to the self-service financial transaction terminal over a network.

4. The method of claim 1, wherein allowing the remote operator to access the terminal further comprises allowing the remote operator to access the terminal via the browser application of a personal computing device.

5. The method of claim 4, wherein allowing the remote operator to access the terminal further comprises receiving the remote operator's entry of a URL address for the terminal by the browser application of the personal computing device.

6. The method of claim 5, wherein allowing the remote operator to access the terminal further comprises receiving the remote operator's entry of the URL address for a web server application of the terminal by the browser application of the personal computing device.

7. The method of claim 1, wherein allowing the remote operator to access the terminal further comprises mutually authenticating the terminal and computing device with one another.

8. The method of claim 1, wherein receiving the entry of the user identification further comprises receiving the remote operator's entry on a logon screen displayed at the computing device.

9. The method of claim 1, wherein receiving the entry of the user identification further comprises receiving the remote operator's entry of the user identification corresponding to a user entitlement.

10. The method of claim 9, wherein receiving the entry of the user identification further comprises receiving the remote operator's entry of at least one of a user ID and a password associated with the user entitlement.

11. The method of claim 1, wherein receiving the entry of the user identification further comprises prompting the remote operator for selection of a preferred language.

12. The method of claim 1, wherein receiving the entry of the user identification further comprises verifying the user identification.

13. The method of claim 1, wherein displaying the menu further comprises displaying the menu of terminal operator functions according to a predetermined user entitlement corresponding to the user identification.

14. The method of claim 1, wherein receiving the remote operator's selection further comprises receiving the selection according to a predetermined user entitlement corresponding to the user identification.

15. The method of claim 1, wherein allowing the remote operator to access the application for the selected function further comprises allowing the remote operator to access the application for the selected function according to a predetermined user entitlement corresponding to the user identification.

16. A system for providing remote operator interface with a self-service financial transaction terminal, comprising:
a plurality of web-based, customer-inaccessible applications for remote operator functions provided on the self-service financial transaction terminal, said remote operator functions being selected from a group of remote operator functions consisting of a reboot function, a stop function, a stop immediately function, a start function, a configure function, a view configuration function, a view software release information function, a view status function, a view integrated network controller and host connection status function, a start peruse function, a view event logs function, a view event logs in real-time function, a write event logs to file function, a start back administration function, a start command shell function, and an initialize personal identification number encryption keys function;
a remote operator interface client computing device adapted for allowing the remote operator to access the self-service financial transaction terminal via a browser application of the remote operator interface client computing device; and
said self-service financial transaction terminal being adapted for receiving the remote operator's entry of a user identification from the remote operator interface client computing device, for displaying a menu of the self-service financial transaction terminal operator functions for the remote operator at the remote operator interface client computing device, means for receiving the remote operator's selection of at least one of the self-service financial transaction terminal operator functions from the remote operator interface client computing device, and for allowing the remote operator at the remote operator interface client to access one of the plurality of web-based, customer-inaccessible applications on the self-service financial transaction terminal for the selected self-service financial terminal operator function.

17. The system of claim 16, wherein the remote operator interface client computing device is further adapted for allowing the remote operator at the remote operator interface client computing device to access the self-service financial transaction terminal via the browser application of the remote operator interface client computing device coupled to the self-service financial transaction terminal.

18. The system of claim 17, wherein the remote operator interface client computing device is further adapted for allowing the remote operator to access the self-service financial transaction terminal via the browser application of the computing device coupled to the self-service financial transaction terminal over a network.

19. The system of claim 16, wherein the remote operator interface client computing device further comprises a personal computing device.

20. The system of claim 19, wherein the personal computing device is adapted for receiving the remote operator's entry of a URL address for the terminal by the browser application of the personal computing device.

21. The system of claim 20, wherein the personal computing device is further adapted for receiving the remote operator's entry of the URL address for a web server application of the terminal by the browser application of the personal computing device.

22. The system of claim 16, wherein the remote operator interface client computing device and the self-service financial transaction terminal are adapted for mutually authenticating the terminal and computing device with one another.

23. The system of claim 16, wherein the the self-service financial transaction terminal is adapted for receiving the remote operator's entry on a logon screen displayed at the computing device.

24. The system of claim 16, wherein the the self-service financial transaction terminal is further adapted for receiving the remote operator's entry of the user identification corresponding to a user entitlement.

25. The system of claim 24, wherein the the self-service financial transaction terminal is further adapted for receiving the remote operator's entry of at least one of a user ID and a password associated with the user entitlement.

26. The system of claim 16, wherein the the self-service financial transaction terminal is further adapted for prompting the remote operator for selection of a preferred language.

27. The system of claim 16, wherein the self-service financial transaction terminal is further adapted for verifying the user identification.

28. The system of claim 16, wherein the self-service financial transaction terminal is further adapted for displaying the menu of terminal operator functions according to a predetermined user entitlement corresponding to the user identification.

29. The system of claim 16, wherein the means self-service financial transaction terminal is further adapted for receiving the selection according to a predetermined user entitlement corresponding to the user identification.

30. The system of claim 16, wherein the self-service financial transaction terminal is further adapted for allowing the remote operator to access the application for the selected function according to a predetermined user entitlement corresponding to the user identification.

31. A method for remote operator interface with a self-service financial transaction terminal, comprising:

providing a plurality of web-based, customer-inaccessible applications for remote operator functions on the self-service financial transaction terminal, said remote operator functions being selected from a group of remote operator functions consisting of a reboot function, a stop function, a stop immediately function, a start function, a configure function, a view configuration function, a view software release information function, a view status function, a view integrated network controller and host connection status function, a start peruse function, a view event logs function, a view event logs in real-time function, a write event logs to file function, a start back administration function, a start command shell function, and an initialize personal identification number encryption keys function;

providing the self-service financial transaction terminal with a web server application having a URL address;

allowing the remote operator to enter the URL address for the web server application on a browser application of a computing device coupled to the self-service financial transaction terminal over a network;

displaying a logon screen at the computing device for the remote operator;

receiving entry of a user identification for the remote operator at the computing device;

displaying a menu of the self-service financial transaction terminal operator functions for the remote operator at the computing device by the self-service financial transaction terminal according to a predetermined entitlement corresponding to the user identification;

receiving the remote operator's selection of at least one of the self-service financial transaction terminal operator functions by the self-service financial transaction terminal from the computing device; and allowing the remote operator at the computing device to access one of the plurality of web-based, customer-inaccessible applications on the self-service financial transaction terminal for the selected self-service financial transaction terminal operator function.

* * * * *

UNITED STATES PATENT AND TRADEMARK OFFICE
CERTIFICATE OF CORRECTION

PATENT NO. : 6,968,321 B1
DATED : November 22, 2005
INVENTOR(S) : Chris S. Yu

It is certified that error appears in the above-identified patent and that said Letters Patent is hereby corrected as shown below:

Title page,
Item [60], Related U.S. Application Data, change "Jan. 11, 1999" to -- November 1, 1999 --.

Column 14,
Line 12, delete "means".
Lines 52, 56, 61 and 65, change "the the self-service" to -- the self-service --.

Column 15,
Line 9, delete "means".

Signed and Sealed this

Fourteenth Day of March, 2006

JON W. DUDAS
*Director of the United States Patent and Trademark Office*